US012753782B2

(12) United States Patent
Ono

(10) Patent No.: US 12,753,782 B2
(45) Date of Patent: Oct. 6, 2026

(54) FLUID PRESSURE CYLINDER

(71) Applicant: SMC CORPORATION, Tokyo (JP)

(72) Inventor: Ryo Ono, Tsukubamirai (JP)

(73) Assignee: SMC CORPORATION, Tokyo (JP)

( * ) Notice: Subject to any disclaimer, the term of this patent is extended or adjusted under 35 U.S.C. 154(b) by 19 days.

(21) Appl. No.: 19/105,902

(22) PCT Filed: Sep. 2, 2022

(86) PCT No.: PCT/JP2022/033112
§ 371 (c)(1),
(2) Date: Feb. 24, 2025

(87) PCT Pub. No.: WO2024/047864
PCT Pub. Date: Mar. 7, 2024

(65) Prior Publication Data
US 2026/0185548 A1 Jul. 2, 2026

(51) Int. Cl.
*F15B 15/14* (2006.01)
*F15B 15/28* (2006.01)

(52) U.S. Cl.
CPC ........ *F15B 15/149* (2013.01); *F15B 15/2892* (2013.01)

(58) Field of Classification Search
CPC ........................... F15B 15/149; F15B 15/2892
See application file for complete search history.

(56) References Cited

U.S. PATENT DOCUMENTS

| | | | | |
|---|---|---|---|---|
| 5,884,549 | A | 3/1999 | Hosono et al. | |
| 2002/0134230 | A1 * | 9/2002 | Hirling | G01D 5/34761 92/5 R |
| 2018/0283417 | A1 * | 10/2018 | Takakuwa | F16B 2/08 |
| 2022/0290409 | A1 * | 9/2022 | Matsumiya | E02F 9/2271 |

FOREIGN PATENT DOCUMENTS

| | | | | |
|---|---|---|---|---|
| DE | 102019104768 | A1 * | 8/2020 | F15B 15/2815 |
| EP | 0125992 | A1 * | 11/1984 | F15B 15/2892 |
| EP | 1 070 855 | B1 | 6/2006 | |
| JP | H109211 | A * | 1/1998 | |
| JP | 2019-113101 | A | 7/2019 | |

OTHER PUBLICATIONS

International Search Report mailed on Nov. 8, 2022 in PCT/JP2022/033112 filed on Sep. 2, 2022, therein, 2 pages.
European Search Report mailed Jun. 24, 2026, in EP Application No. 22957458.7, filed on Sep. 2, 2022, (8 pages).

* cited by examiner

*Primary Examiner* — Thomas E Lazo
(74) *Attorney, Agent, or Firm* — Oblon, McClelland, Maier & Neustadt, L.L.P.

(57) ABSTRACT

A fluid pressure cylinder includes a cylinder section and an adapter unit detachably mounted to a cylinder tube of the cylinder section. A first input/output port and a second input/output port communicating with a piston chamber are provided in the cylinder tube. A first attachment hole and a second attachment hole are provided in the adapter unit. A first supply/discharge tube and a connected second supply/discharge tube are attached to the first attachment hole and the second attachment hole, respectively.

9 Claims, 5 Drawing Sheets

FLUID PRESSURE CYLINDER

TECHNICAL FIELD

The present invention relates to a fluid pressure cylinder which operates based on supply and discharge of a pressure fluid.

BACKGROUND ART

As described in JP 2019-113101 A, an air cylinder includes a cylinder tube in which a piston chamber is formed, and a piston accommodated in the piston chamber. A supply/discharge tube for supplying and discharging compressed air to and from the piston chamber is connected to the air cylinder. In some cases, a position sensor for detecting the position of the piston is provided in the cylinder tube. Further, a seal member (packing) is mounted on a side peripheral wall (outer peripheral portion) of the piston. The seal member seals a gap between a side peripheral wall of the piston and an inner peripheral wall of the piston chamber.

The piston moves in the piston chamber based on supply and discharge of compressed air to and from the piston chamber. Accordingly, the seal member is brought into sliding contact with the side peripheral wall of the piston. Therefore, when the operation of the air cylinder is repeated, the seal member becomes worn. That is, the seal member is a consumable part. The air cylinder includes various types of consumable parts in addition to the seal part. Therefore, the air cylinder requires periodic maintenance.

The air cylinder is assembled to a predetermined apparatus or equipment, for example. Therefore, when a maintenance work is performed on the air cylinder, the air cylinder needs to be removed from the predetermined apparatus or equipment. Next, the supply/discharge tube is detached from the air cylinder. If the position sensor is attached to the air cylinder, the position sensor is then removed from the air cylinder. Next, the air cylinder is disassembled and the consumable parts are replaced.

The air cylinder is then assembled and the position sensor is then attached to the air cylinder. Next, the supply/discharge tube is attached to the air cylinder. Next, the air cylinder is assembled to the predetermined apparatus or equipment, and the mounting position of the position sensor is adjusted. That is, for example, the piston is shifted to a predetermined position, and the position sensor is disposed at a position where the piston in this state can be detected. The maintenance work is completed through the above operation sequence.

SUMMARY OF THE INVENTION

As can be understood from the above, the maintenance work of the air cylinder includes many work processes. Therefore, it is not easy to perform the maintenance work on the air cylinder. Further, while the maintenance work is being performed on the air cylinder, operation of the apparatus or equipment to which the air cylinder should be assembled must be stopped. Therefore, the operation efficiency of the apparatus or equipment is reduced.

After the air cylinder has been assembled, the piston is accommodated in the cylinder tube. Therefore, the operator cannot visually recognize the piston. Under such circumstances, it is not easy to align the piston and the position sensor.

An object of the present invention is to solve the above-described problems.

An aspect of the present invention is characterized by a fluid pressure cylinder including: a cylinder unit including a cylinder tube in which a piston chamber is formed, and a piston accommodated in the piston chamber and configured to be slidable in an axial direction of the cylinder tube; an adapter unit configured to be attachably and detachably mounted on the cylinder tube; and a positioning member configured to position the adapter unit with respect to the cylinder unit, wherein the cylinder tube includes a first input/output port and a second input/output port configured to communicate with the piston chamber to supply and discharge a pressure fluid to and from the piston chamber, wherein the adapter unit includes: a first attachment hole to which a first supply/discharge tube is attached to be connected to the first input/output port; a second attachment hole to which a second supply/discharge tube is attached to be connected to the second input/output port; and a position sensor configured to detect a position of the piston, and wherein the adapter unit is attachable to and detachable from the cylinder unit in a state of holding the position sensor, and the adapter unit is positioned and fixed to the cylinder tube via the positioning member.

With the above-described configuration, the adapter unit can be removed from the cylinder tube in a state that the first supply/discharge tube, the second supply/discharge tube, and the like are connected to the adapter unit and the adapter unit holds the position sensor. Therefore, for example, in a case that the seal member in the cylinder tube is replaced with a new one, the adapter unit is first separated from the cylinder tube, and then the cylinder unit is disassembled.

In this way, according to the present invention, when maintenance is performed on the cylinder unit, it is not necessary to remove the first supply/discharge tube, the second supply/discharge tube, the position sensor, and the like from the adapter unit. Therefore, the number of maintenance work processes is reduced. Further, the maintenance work is simplified. That is, according to the present invention, maintenance can be performed on the fluid pressure cylinder easily.

Moreover, the mounting position of the position sensor with respect to the adapter unit remains unchanged before and after the adapter unit is removed from the cylinder tube. Therefore, after the adapter unit is attached to the cylinder tube, the piston is positioned at a predetermined position, whereby the position sensor and the piston can be aligned with each other. Thus, the piston and the position sensor can be easily aligned with each other even under a situation where the worker cannot visually recognize the piston.

In addition, the cylinder tube and the adapter unit are connected by the positioning member, whereby the adapter unit can be easily positioned and fixed to the cylinder tube.

DETAILED DESCRIPTION OF THE INVENTION

Figure 1:
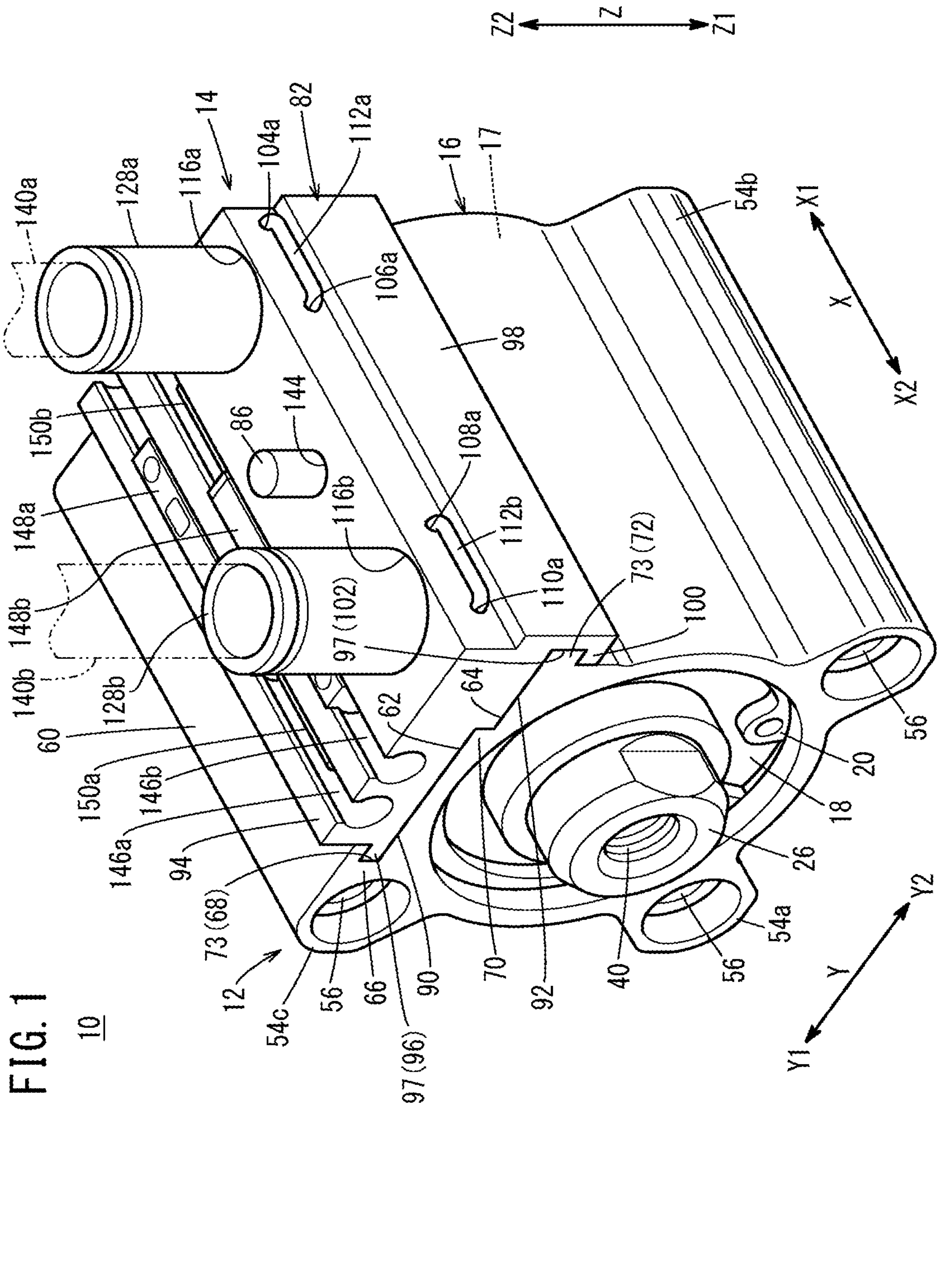
FIG. 1 is a schematic overall perspective view of an air cylinder (fluid pressure cylinder) according to an embodiment of the present invention.

Hereinafter, an air cylinder will be described as an example of a fluid pressure cylinder. The pressure fluid is therefore compressed air. The fluid pressure cylinder may be a hydraulic cylinder. In this case, the pressure fluid is hydraulic oil. Further, the air cylinder illustrated in the drawings is a single-rod cylinder, but may be a double-rod cylinder.

The X direction shown in the drawings is the axial direction of an air cylinder or a cylinder tube. The X1 direction and the X2 direction along the X direction are opposite to each other. The Y direction shown in the drawings is a horizontal direction orthogonal to the X direction. The Y1 direction and the Y2 direction along the Y direction are opposite to each other. The Z direction shown in the drawings is an up-down direction orthogonal to the X direction and the Y direction. The Z1 direction along the Z direction is a down direction and the Z2 direction along the Z direction is an up direction.

Figure 2:
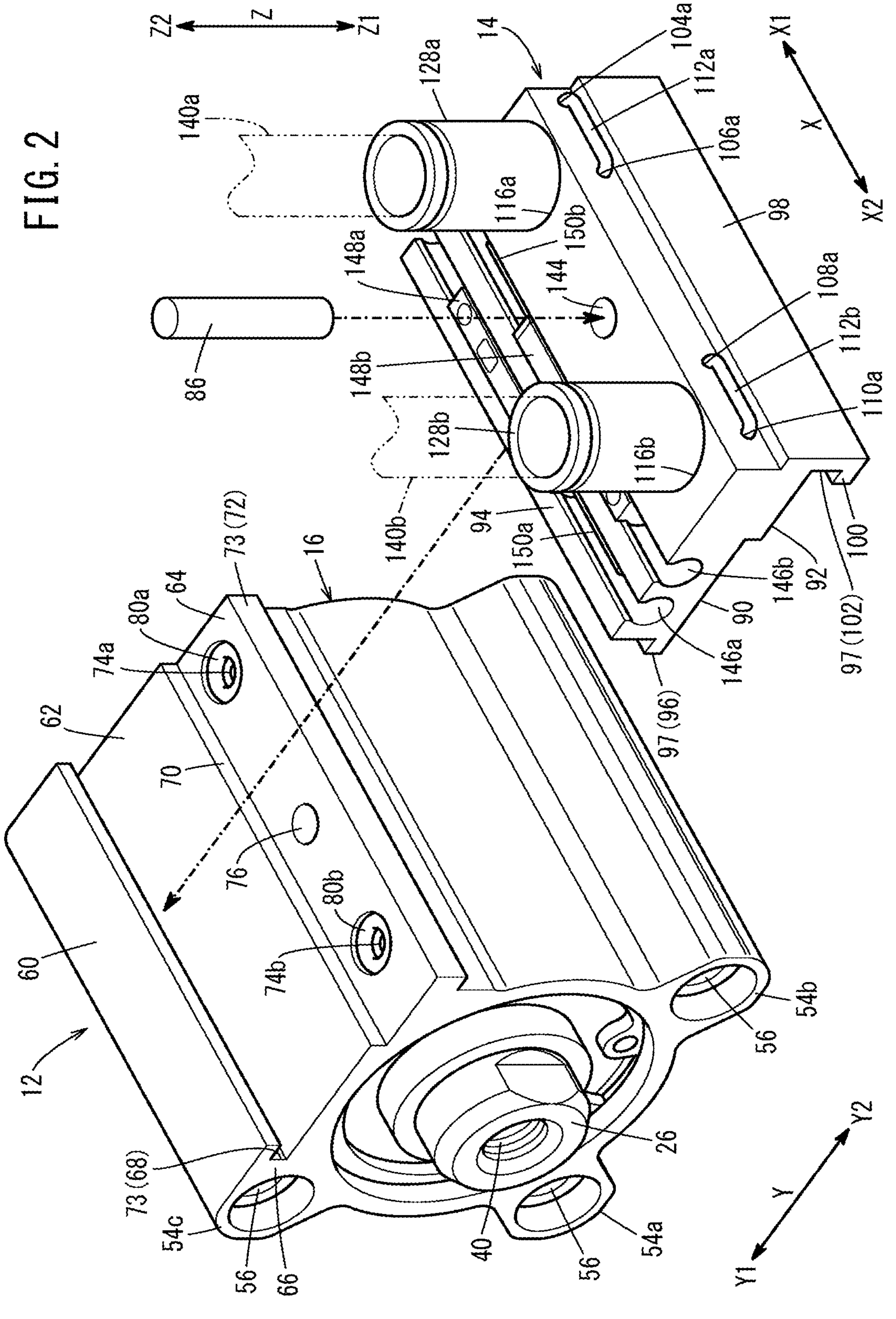
FIG. 2 is an exploded perspective view showing the air cylinder, which is separated into a cylinder unit and an adapter unit.
Figure 3:
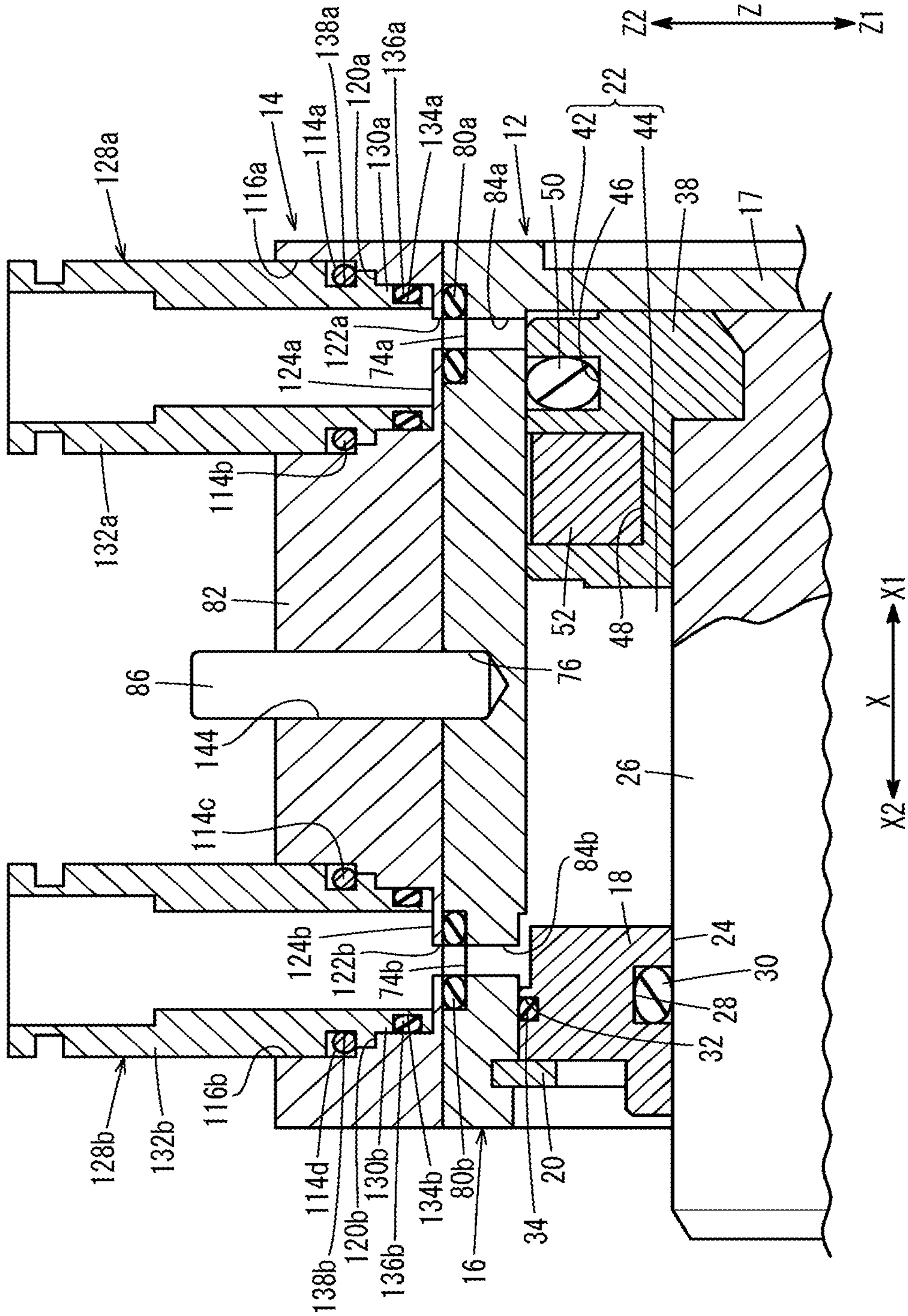
FIG. 3 is a side sectional view of the air cylinder as viewed along the axial direction.

FIG. 1 is a schematic overall perspective view of an air cylinder 10 according to the present embodiment. FIG. 2 is an exploded perspective view of the air cylinder 10. FIG. 3 is a side sectional view taken along the axial direction of the air cylinder 10. As shown in FIGS. 1 to 3, the air cylinder 10 includes a cylinder unit 12 and an adapter unit 14.

The cylinder unit 12 includes a cylinder tube 16. As shown in FIG. 3, an X1-side end portion of the cylinder tube 16 is a closed end provided with a closing portion 17. An X2-side end portion of the cylinder tube 16 is an open end and is closed by a cover member 18. The cover member 18 is positioned and fixed to the cylinder tube 16 via a snap ring 20. An internal space is formed in the cylinder tube 16 by the closing portion 17 and the cover member 18. The internal space is a piston chamber 22.

An insertion hole 24 is formed in the cover member 18. A piston rod 26 is inserted through the insertion hole 24. An inner annular groove 28 is formed in an inner peripheral wall of the insertion hole 24, and an inner seal member 30 is received in the inner annular groove 28. The inner seal member 30 seals a gap between the inner peripheral wall of the insertion hole 24 and the side peripheral wall of the piston rod 26 in an airtight manner. An outer annular groove 32 is formed in an outer peripheral wall of the cover member 18. An outer seal member 34 is received in the outer annular groove 32. The outer seal member 34 seals a gap between the outer peripheral wall of the cover member 18 and the inner peripheral wall of the piston chamber 22 in an airtight manner.

An X1-side end portion of the piston rod 26 enters the piston chamber 22. A piston 38 is mounted on the X1-side end portion of the piston rod 26. In other words, the piston 38 is accommodated in the piston chamber 22 in a state of being connected to the X1-side end portion of the piston rod 26. A coupling hole 40 is formed in the X2-side end portion of the piston rod 26. A part of a workpiece (not shown) is inserted into the coupling hole 40. Therefore, when the piston 38 is displaced in the piston chamber 22, the piston rod 26 and the workpiece are displaced integrally with the piston 38. The workpiece is, for example, a predetermined jig.

The piston 38 separates the piston chamber 22 into a first chamber 42 and a second chamber 44. The first chamber 42 is a space surrounded by an X1-side end surface of the piston 38, an inner surface (X2-side end surface) of the closing portion 17 facing the piston chamber 22, and an inner peripheral wall of the piston chamber 22. The second chamber 44 is a space surrounded by an X2-side rear end surface of the piston 38, an inner surface (X1-side end surface) of the cover member 18 facing the piston chamber 22, and an inner peripheral wall of the piston chamber 22.

An annular packing mounting groove 46 and an annular magnet mounting groove 48 are formed in an outer peripheral wall of the piston 38. A packing 50 is received in the packing mounting groove 46. The packing 50 prevents compressed air in the first chamber 42 from leaking into the second chamber 44. Similarly, compressed air in the second chamber 44 is prevented from leaking into the first chamber 42. A magnet 52 is mounted in the magnet mounting groove 48.

As shown in FIGS. 1 to 3, a first protruding portion **54*a* and a second protruding portion 54*b* are provided respectively at a Y1-side end portion and a Y2-side end portion of the lower portion of the cylinder tube 16. A third protruding portion 54*c* is provided at the Y1-side end portion of the upper portion of the cylinder tube 16. The first to third protruding portions 54*a* to 54*c* extend along the axial direction (X direction) of the cylinder tube 16. The first to third protruding portions 54*a* to 54*c* are each provided with an elongated hole 56. For example, a long bolt (not shown) for attaching the air cylinder 10 to a predetermined apparatus or equipment is inserted into the elongated hole 56**.

A first flat portion 60, a second flat portion 62, and a third flat portion 64 are formed on the upper surface of the cylinder tube 16 (see FIG. 2). The first flat portion 60 has a flat surface provided on the upper surface of the third protruding portion **54*c*. The second flat portion 62 is adjacent to the first flat portion 60 via a first stepped portion 66. The second flat portion 62 is a flat surface parallel to the axial direction (X direction) of the cylinder tube 16 and parallel to the Y direction. A first recessed groove 68 recessed toward the Y1-side is formed in the first stepped portion 66. The first recessed groove 68 extends in the axial direction (X direction) of the cylinder tube 16**.

The third flat portion 64 is a flat surface parallel to the axial direction (X direction) of the cylinder tube 16 and parallel to the Y direction. The third flat portion 64 is located at the Y2-side end portion where the first to third protruding portions **54*a*-54*c* are not provided, in the upper portion of the cylinder tube 16. The third flat portion 64 is adjacent to the second flat portion 62 via a second stepped portion 70. As can be seen from FIGS. 1 and 2, the first flat portion 60 is at the highest position, and the third flat portion 64 is at the lowest position. The Y2-side end portion of the third flat portion 64 slightly protrudes beyond the curved Y2-side end portion of the side portion of the cylinder tube 16. Thus, a first protruding end 72 is formed on the cylinder tube 16. The first protruding end 72 extends in the axial direction of the cylinder tube 16**.

The cylinder tube 16 has a cylinder-side engagement portion 73 that can engage with an adapter-side engagement portion 97 described later. The cylinder-side engagement portion 73 has the first recessed groove 68 and the first protruding end 72 described above.

The second flat portion 62 and the third flat portion 64 each have a flat surface extending along the axial direction (X direction) of the cylinder tube 16. The flat surfaces of the second flat portion 62 and the third flat portion 64 support the adapter unit 14. That is, the second flat portion 62 and the third flat portion 64 are adapter supporting surfaces.

As shown in FIGS. 2 and 3, the third flat portion 64 is formed with a first seal accommodation hole 74*a*, a second seal accommodation hole 74*b*, and an engagement recess 76. As shown in FIG. 3, a first seal member 80*a* and a second seal member 80*b* are accommodated in the first seal accommodation hole 74*a* and the second seal accommodation hole 74*b*, respectively. The first seal member 80*a* and the second seal member 80*b* seal a gap between the cylinder tube 16 and a base member 82 (described later) forming the adapter unit 14, in an airtight manner.

A first input/output port 84*a* is opened in a bottom surface of the first seal accommodation hole 74*a*. The first input/output port 84*a* extends toward the first chamber 42 and communicates with the first chamber 42. A second input/output port 84*b* is opened in a bottom surface of the second seal accommodation hole 74*b*. The second input/output port 84*b* extends toward the second chamber 44 and communicates with the second chamber 44.

The engagement recess 76 is located between the first input/output port 84*a* and the second input/output port 84*b*. One end of a positioning pin 86 (positioning member), which will be described later, is inserted into the engagement recess 76. The engagement recess 76 is, for example, a bottomed hole. The positioning pin 86 constrains the adapter unit 14 to the cylinder tube 16. As a result, the adapter unit 14 is positioned with respect to the cylinder unit 12.

Next, the adapter unit 14 will be described. The adapter unit 14 includes the base member 82 shown in FIG. 4. The base member 82 includes a first bottom portion 90 that abuts against the second flat portion 62 of the cylinder tube 16 and a second bottom portion 92 that abuts against the third flat portion 64 of the cylinder tube 16. The first bottom portion 90 and the second bottom portion 92 are flat surfaces.

The base member 82 includes a second protruding end 96 provided at a Y1-side end portion 94 facing the first flat portion 60 of the cylinder tube 16. In particular, as shown in FIG. 2, the second protruding end 96 extends from the first bottom portion 90 toward the first recessed groove 68 and is inserted into the first recessed groove 68. The second protruding end 96 extends along the axial direction of the cylinder tube 16. The adapter unit 14 includes an adapter-side engagement portion 97 engageable with the cylinder-side engagement portion 73. The second protruding end 96 of the base member 82 is one of the adapter-side engagement portions 97 and engages with the first recessed groove 68.

In the base member 82, a Y2-side end portion 98, which is an end portion on the opposite side of the Y1-side end portion 94, extends so as to cover the first protruding end 72. A third protruding end 100 is provided at a lower portion of the Y2-side end portion 98. The third protruding end 100 protrudes in the Y1 direction, similarly to the second protruding end 96. The second bottom portion 92, the Y2-side end portion 98, and the third protruding end 100 form a second recessed groove 102. The second recessed groove 102 extends along the axial direction of the cylinder tube 16. The first protruding end 72 of the cylinder tube 16 is inserted into the second recessed groove 102 (see FIG. 1 in particular). Thus, the second recessed groove 102 of the base member 82 is another one of the adapter-side engagement portions 97, and engages with the first protruding end 72.

Figure 4:
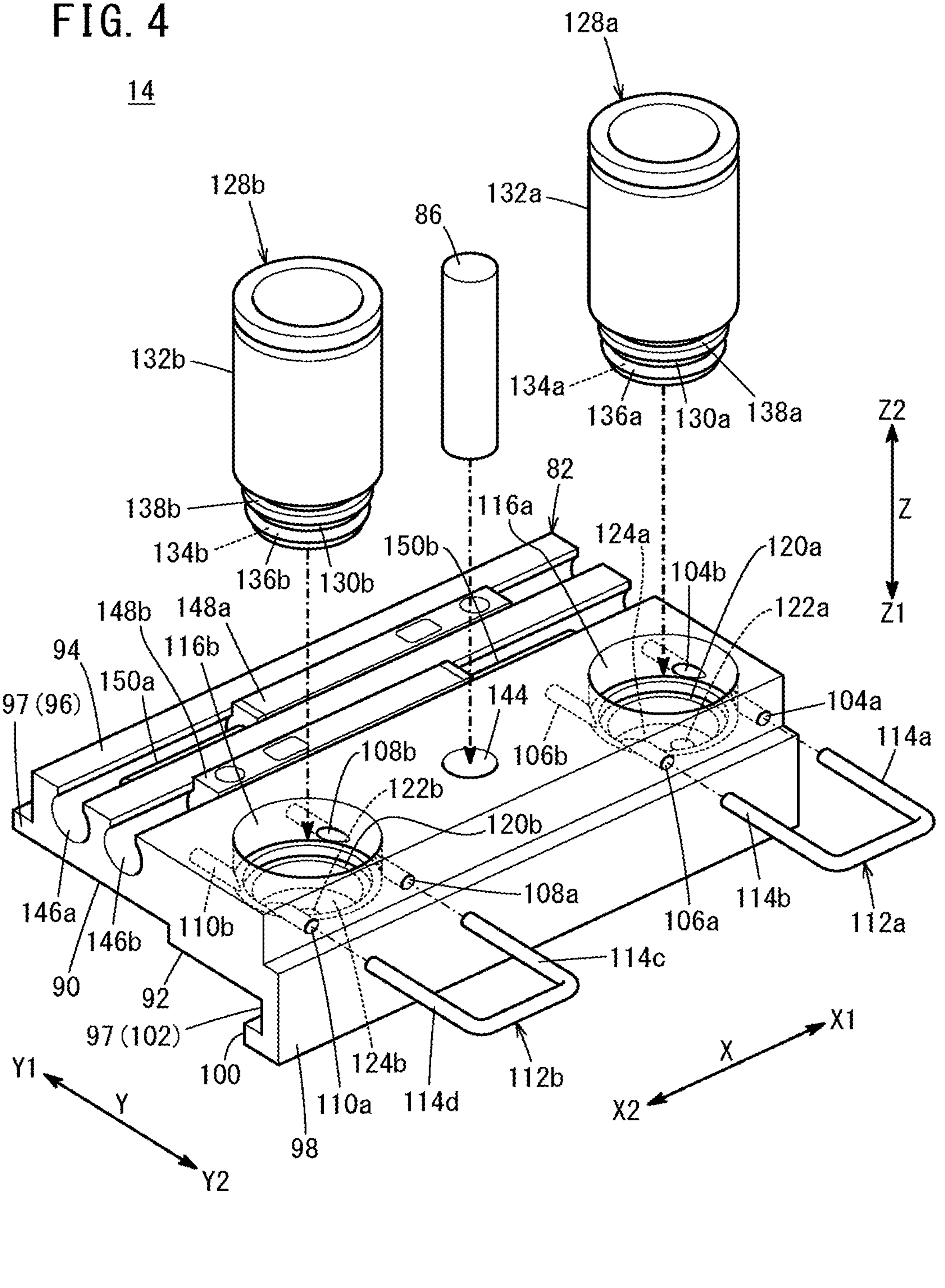
FIG. 4 is an exploded perspective view of the adapter unit.

As shown in FIG. 4, pin holes 104*a*, 106*a*, 108*a*, and 110*a* are formed in the Y2-side end portion 98. The pin hole 104*a*, the pin hole 106*a*, the pin hole 108*a*, and the pin hole 110*a* extend toward the Y1 direction. Leg portions 114*a* and 114*b* of a U-shaped first slide pin 112*a* are inserted into the pin hole 104*a* and the pin hole 106*a*, respectively. Leg portions 114*c* and 114*d* of a U-shaped second slide pin 112*b* are inserted into the pin hole 108*a* and the pin hole 110*a*, respectively.

A first attachment hole 116*a* and a second attachment hole 116*b* are formed in the upper surface of the base member 82. The first attachment hole 116*a* and the second attachment hole 116*b* extend along the up-down direction (Z direction). The pin hole 104*a* and the pin hole 106*a* are in communication with the first attachment hole 116*a*. Here, the pin hole 104*b* and the pin hole 106*b* are formed in the inner peripheral wall of the first attachment hole 116*a* so as to be aligned respectively with the pin hole 104*a* and the pin hole 106*a* in the respective same axis lines. In other words, the pin hole 104*a* and the pin hole 104*b* are lined up with the first attachment hole 116*a* interposed therebetween, and the pin hole 106*a* and the pin hole 106*b* are lined up with the first attachment hole 116*a* interposed therebetween.

The first attachment hole 116*a* has an inside diameter difference in the vicinity of a bottom wall of the first attachment hole. Based on this difference in inside diameter, a first annular stepped portion 120*a* is provided in the first attachment hole 116*a*. A first communication hole 122*a* is formed in a bottom wall of the first attachment hole 116*a*. A thin-walled portion 124*a* in the vicinity of the first communication hole 122*a* presses the first seal member 80*a*.

A first tube fitting 128*a* is inserted into the first attachment hole 116*a*. As shown in FIGS. 3 and 4, the first tube fitting 128*a* is a cylindrical body having a small-diameter portion 130*a* with a small outer diameter and a large-diameter portion 132*a* with a large outer diameter. An annular first mounting groove 134*a* is formed in an outer peripheral wall of the small-diameter portion 130*a*. A first fitting seal member 136*a* is mounted in the first mounting groove 134*a*. An annular first engagement groove 138*a* is formed in an outer peripheral wall of the large-diameter portion 132*a*. The leg portions 114*a* and 114*b* of the first slide pin 112*a* are engaged with the first engagement groove 138*a*.

More specifically, when the first tube fitting 128*a* is inserted into the first attachment hole 116*a*, as shown in FIG. 3, the lower surface of the small-diameter portion 130*a* abuts against the thin-walled portion 124*a*, and the lower surface of the large-diameter portion 132*a* abuts against the first annular stepped portion 120*a*. In this state, the leg portions 114*a* and 114*b* of the first slide pin 112*a* are inserted into the pin hole 104*a* and the pin hole 106*a*, respectively. The tips of the leg portions 114*a* and 114*b* protrude from the pin hole 104*a* and the pin hole 106*a*, respectively, and enter the pin hole 104*b* and the pin hole 106*b*, respectively, after passing through the first engagement groove 138*a* of the first tube fitting 128*a*.

As a result, the substantially middle portions of the leg portions 114*a* and 114*b* in the axial direction engage with the first engagement groove 138*a*. Thus, the first tube fitting 128*a* is clamped by the leg portions 114*a* and 114*b*, and the first tube fitting 128*a* is prevented from coming off from the first attachment hole 116*a*. The first fitting seal member 136*a* seals a gap between the outer peripheral wall of the small-diameter portion 130*a* of the first tube fitting 128*a* and the inner peripheral wall of the first attachment hole 116*a*.

Similarly to the above, the pin hole 108*a* and the pin hole 110*a* are in communication with the second attachment hole 116*b*. The pin hole 108*b* and the pin hole 110*b* are formed in the inner peripheral wall of the second attachment hole 116*b* so as to be aligned respectively with the pin hole 108*a* and the pin hole 110*a* in the respective same axis lines.

Similarly, a second annular stepped portion 120*b* is provided in the vicinity of the bottom wall of the second attachment hole 116*b*, based on the difference in inside diameter of the second attachment hole 116*b*. A second communication hole 122*b* is formed in the bottom wall of the second attachment hole 116*b*. A thin-walled portion 124*b* in the vicinity of the second communication hole 122*b* presses the second seal member 80*b*.

A second tube fitting 128*b* is inserted into the second attachment hole 116*b*. As shown in FIG. 3, the shape of the second tube fitting 128*b* is identical to the shape of the first tube fitting 128*a*. That is, the second tube fitting 128*b* has a small-diameter portion 130*b* and a large-diameter portion 132*b*. A second mounting groove 134*b* is formed in the outer peripheral wall of the small-diameter portion 130*b*, and a second fitting seal member 136*b* is mounted in the second mounting groove 134*b*. A second engagement groove 138*b* is formed in the outer peripheral wall of the large-diameter portion 132*b*. The leg portions 114*c* and 114*d* of the second slide pin 112*b* are engaged with the second engagement groove 138*b*.

When the second tube fitting 128*b* is inserted into the second attachment hole 116*b*, the lower surface of the small-diameter portion 130*b* abuts against the thin-walled portion 124*b*, and the lower surface of the large-diameter portion 132*b* abuts against the second annular stepped portion 120*b*. In this state, the leg portion 114*c* of the second slide pin 112*b* is inserted into the pin hole 108*b* via the pin hole 108*a* and the second attachment hole 116*b*, and the leg portion 114*d* is inserted into the pin hole 110*b* via the pin hole 110*a* and the second attachment hole 116*b*. As a result, the second tube fitting 128*b* is clamped to the leg portions 114*c* and 114*d*, and the second tube fitting 128*b* is prevented from coming off from the second attachment hole 116*b*. The second fitting seal member 136*b* seals a gap between the outer peripheral wall of the small-diameter portion 130*b* of the second tube fitting 128*b* and the inner peripheral wall of the second attachment hole 116*b*.

The first tube fitting 128*a* and the second tube fitting 128*b* may be connected to the base member 82 via screws.

As shown in FIGS. 1 to 3, an end of a first supply/discharge tube 140*a* is connected to the first tube fitting 128*a*, and an end of a second supply/discharge tube 140*b* is connected to the second tube fitting 128*b*. The other ends (not shown) of the first supply/discharge tube 140*a* and the second supply/discharge tube 140*b* are connected to a supply/discharge mechanism (not shown). Compressed air flows through the first supply/discharge tube 140*a* and the second supply/discharge tube 140*b*.

As shown in FIGS. 1, 2, and 4, an insertion hole 144 is formed between the first attachment hole 116*a* and the second attachment hole 116*b* on the upper surface of the base member 82. As shown in FIG. 3, the insertion hole 144 penetrates the base member 82 along the Z direction. The insertion hole 144 is overlapped with the engagement recess 76. The positioning pin 86 is inserted into the engagement recess 76 and the insertion hole 144 which are overlapped with each other. By this insertion, the adapter unit 14 is positioned and fixed to the cylinder tube 16.

Further, in the upper surface of the base member 82, a first sensor mounting groove 146*a* is formed in the vicinity of the Y1-side end portion 94. A second sensor mounting groove 146*b* is formed adjacent to the first sensor mounting groove 146*a*. The second sensor mounting groove 146*b* is closer to the first tube fitting 128*a* and the second tube fitting 128*b* than the first sensor mounting groove 146*a*. The first sensor mounting groove 146*a* receives a first position sensor 148*a*, and the second sensor mounting groove 146*b* receives a second position sensor 148*b*. The upper surfaces of the first position sensor 148*a* and the second position sensor 148*b* are substantially flush with the upper surface of the base member 82. The first position sensor 148*a* and the second position sensor 148*b* are electrically connected to a control unit (not shown) via cables 150*a* and 150*b*, respectively.

The air cylinder 10 according to the present embodiment is basically configured as described above. Next, the operations and advantageous effects of the air cylinder 10 will be described.

A workpiece is connected to the piston rod 26. More specifically, a portion of the workpiece is inserted into the coupling hole 40 of the piston rod 26. The air cylinder 10 operates in this state.

FIG. 3 shows a state where a working air is supplied to the second chamber 44 while the working air is discharged from the first chamber 42. In this case, since the internal pressure of the second chamber 44 is higher than the internal pressure of the first chamber 42, the piston 38 is moved in the X1 direction by receiving the pressure from the working air in the second chamber 44, and is positioned at the first position, which is closest to the closing portion 17. For moving the piston 38 in the X2 direction from this state, the working air is supplied to the first chamber 42, and the working air is discharged from the second chamber 44. More specifically, the working air is sent from the supply and discharge mechanism to the first chamber 42. The working air flows through the first supply/discharge tube 140*a* and then flows into the first input/output port 84*a* via the first communication hole 122*a*. The working air passes through the first input/output port 84*a* and then flows into the first chamber 42. As a result, the internal pressure of the first chamber 42 increases.

On the other hand, the working air in the second chamber 44 is discharged by the supply/discharge mechanism. The working air in the second chamber 44 passes through the second input/output port 84*b* and the second communication hole 122*b* in this order, and then flows into the second supply/discharge tube 140*b*. Thus, the working air in the second chamber 44 is discharged through the second supply/discharge tube 140*b*. As a result, the internal pressure of the second chamber 44 decreases.

Figure 5:
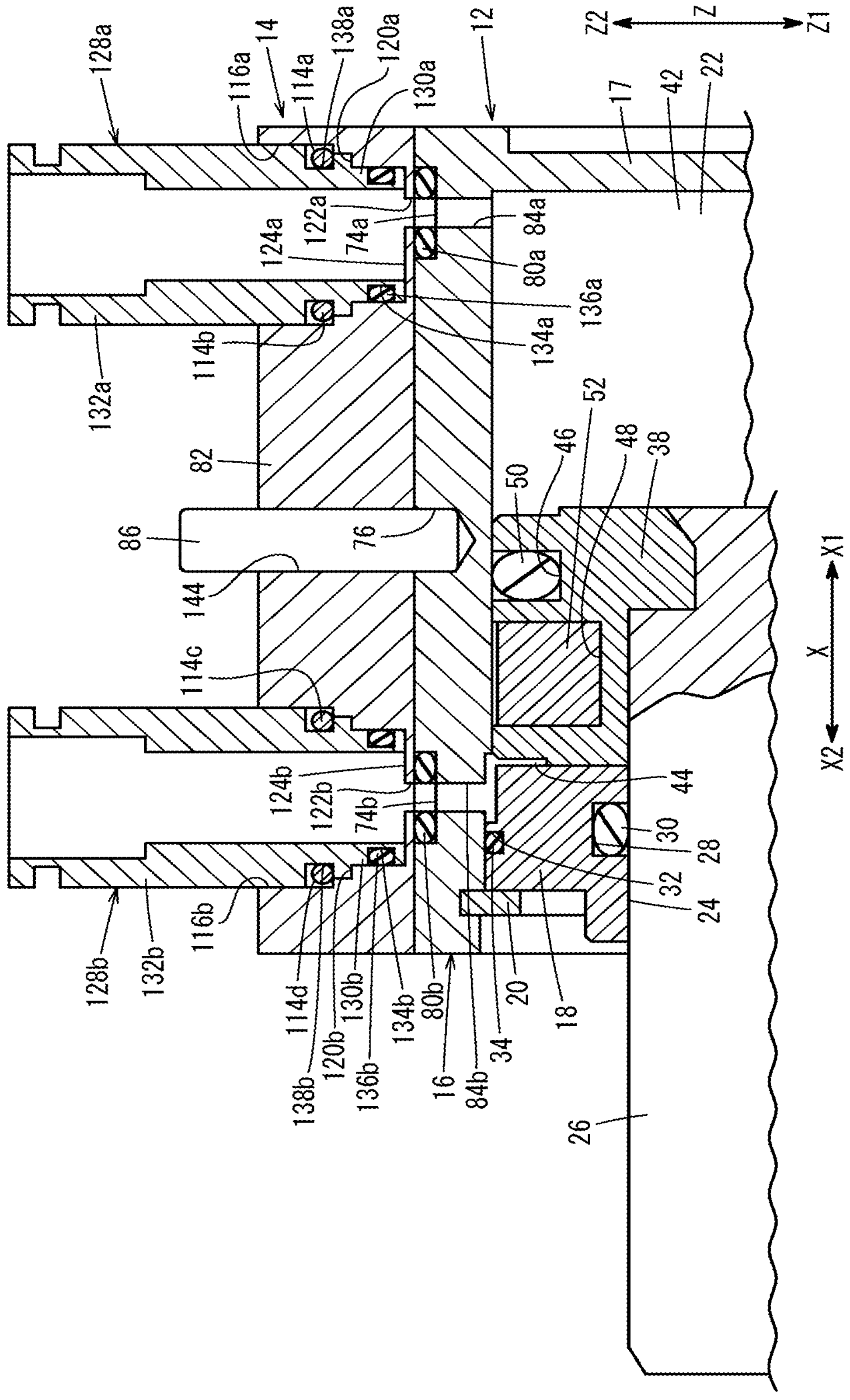
FIG. 5 is a side sectional view showing a state in which the piston is moved from the state shown in FIG. 3.

As the internal pressure difference is generated between the first chamber 42 and the second chamber 44 as described above, the piston 38 receives a pressure from the working air in the first chamber 42. As a result, the piston 38 slides. That is, the piston 38 moves toward the cover member 18 positioned at the X2-side end portion. As a result, the air cylinder 10 is brought into a state shown in FIG. 5. In FIG. 5, the piston 38 is located at a second position. Thus, the workpiece connected to the piston rod 26 is moved, for example. The second position sensor 148*b* detects the magnetic force of the magnet 52, and based on this detection, it is detected that the piston 38 has reached the second position. The control unit receives the detection signal from the second position sensor 148*b* and recognizes that the piston 38 has moved to the second position.

In order to return the piston 38 to the state shown in FIG. 3, working air is sent out from the supply/discharge mechanism to the second chamber 44, and working air is discharged from the first chamber 42 by the supply/discharge mechanism. The working air in the first chamber 42 passes through the first input/output port 84*a* and the first communication hole 122*a* in this order, and then flows into the first supply/discharge tube 140*a*. Thus, the working air in the first chamber 42 is discharged through the first supply/discharge tube 140*a*, and the internal pressure of the first chamber 42 decreases.

The working air sent from the supply/discharge mechanism flows through the second supply/discharge tube 140*b*.

Subsequently, the working air passes through the second communication hole 122*b* and the second input/output port 84*b* in this order and then flows into the second chamber 44. As a result, the internal pressure of the second chamber 44 increases. As a result of the internal pressure difference between the first chamber 42 and the second chamber 44, the piston 38 slides. That is, the piston 38 moves toward the closing portion 17 located at the X1-side end portion and reaches the first position. As a result, the air cylinder 10 returns to the state shown in FIG. 3. At this time also, the workpiece connected to the piston rod 26 is moved, for example. The first position sensor 148*a* detects the magnetic force of the magnet 52, and based on this detection, it is detected that the piston 38 has reached the first position. The control unit receives the detection signal from the first position sensor 148*a* and recognizes that the piston 38 has moved to the first position.

When the piston 38 repeats the above-described reciprocating motion, the packing 50 and the inner seal member 30 mounted on the outer peripheral wall of the piston 38 repeatedly slide while being in contact respectively with the inner peripheral wall of the piston chamber 22 and the side peripheral wall of the piston rod 26. The packing 50 and the inner seal member 30 wear due to the sliding contact. When the packing 50 and the inner seal member 30 are excessively worn, the compressed air leaks between the first chamber 42 and the second chamber 44, and thus it becomes difficult to move the piston 38. In order to avoid this, the packing 50 and the inner seal member 30 are replaced with new ones.

For this purpose, the adapter unit 14 is detached from the cylinder unit 12. More specifically, a worker who performs a maintenance work grips the positioning pin 86 with fingers or the like and pulls the positioning pin 86 in the Z2 direction. As a result, the positioning pin 86 is detached from the engagement recess 76 and the insertion hole 144. As a result, the base member 82 is released from the constraint by the positioning pin 86. At this time, the second protruding end 96 is engaged with the first recessed groove 68, and the first protruding end 72 is engaged with the second recessed groove 102, so that the adapter unit 14 is prevented from moving in the Z direction relative to the cylinder unit 12. Therefore, the adapter unit 14 is prevented from falling off from the cylinder unit 12.

Next, as shown in FIG. 2, the worker pulls the base member 82 in the Y2 direction. That is, the base member 82 is slid in the Y2 direction. At this time, the first bottom portion 90 and the second bottom portion 92 of the base member 82 are in sliding contact with the second flat portion 62 and the third flat portion 64 of the cylinder tube 16. Since the first bottom portion 90, the second bottom portion 92, the second flat portion 62, and the third flat portion 64 are all flat surfaces, the worker can easily slide the base member 82 toward the Y2 direction while being in sliding contact with the cylinder tube 16.

With this sliding, the engagement of the second protruding end 96 with the first recessed groove 68 is released, and the engagement of the first protruding end 72 with the second recessed groove 102 is released. As a result, the cylinder tube 16 is released from the constraint by the base member 82. Thus, the base member 82 can be easily separated from the cylinder tube 16. That is, according to the present embodiment, the adapter unit 14 can be detached from the cylinder unit 12 in a state where the first tube fitting 128*a*, the first supply/discharge tube 140*a*, the second tube fitting 128*b*, and the second supply/discharge tube 140*b* are connected to the base member 82. Further, it is not necessary to remove the first position sensor 148*a* and the second position sensor 148*b* from the base member 82. In addition, it is not necessary to remove the cables 150*a* and 150*b* electrically connecting the first position sensor 148*a* and the second position sensor 148*b* to the control unit, from the base member 82.

As described above, the upper surfaces of the first position sensor 148*a* and the second position sensor 148*b* are substantially flush with the upper surface of the base member 82. Owing to this configuration, after the adapter unit 14 is separated from the cylinder unit 12, the upper surfaces of the first position sensor 148*a* and the second position sensor 148*b* are prevented from interfering with any objects. Therefore, the first position sensor 148*a* and the second position sensor 148*b* are prevented from being damaged due to the interference. In other words, the first position sensor 148*a* and the second position sensor 148*b* are protected owing to the mounting of the first position sensor 148*a* in the first sensor mounting groove 146*a* and the mounting of the second position sensor 148*b* in the second sensor mounting groove 146*b*.

Next, the worker replaces the cylinder unit 12 with a spare unit, for example. For this purpose, the worker loosens a long bolt or the like which connects the cylinder unit 12 to the apparatus, the equipment, or the like. Thus, the cylinder unit 12 is removed from the apparatus, the equipment, or the like.

Next, the worker slides the adapter unit 14 from the Y2 direction toward the Y1 direction along the second flat portion 62 and the third flat portion 64 of a spare cylinder unit. For the same reason as described above, the worker can easily slide the base member 82 toward the Y1 direction while the first bottom portion 90 and the second bottom portion 92 of the base member 82 are respectively in sliding contact with the second flat portion 62 and the third flat portion 64 of the cylinder tube 16. As the base member 82 is slid in this manner, the second protruding end 96 is inserted into the first recessed groove 68, and the first protruding end 72 is inserted into the second recessed groove 102. The base member 82 is thereby temporarily fixed to the cylinder tube 16.

The worker further aligns the insertion hole 144 with the engagement recess 76. Thereafter, the worker inserts the positioning pin 86 into the insertion hole 144. The tip of the positioning pin 86 is inserted into the engagement recess 76 through the insertion hole 144, whereby the base member 82 is constrained to the cylinder tube 16. That is, the adapter unit 14 is positioned with respect to the cylinder tube 16.

In the work of separating the adapter unit 14 from the cylinder unit 12 and the work of assembling the spare cylinder unit to the adapter unit 14, the first position sensor 148*a* and the second position sensor 148*b* remain attached to the base member 82. Therefore, for the spare unit, it is not particularly necessary to perform the alignment of the first position sensor 148*a* and the second position sensor 148*b* with the piston 38. This also simplifies the maintenance work.

Thereafter, the user of the air cylinder 10 operates the spare cylinder unit. During this time, the worker disassembles the cylinder unit 12. For example, the worker removes the snap ring 20 and the cover member 18 from the cylinder tube 16, and takes the piston rod 26 and the piston 38 out from the piston chamber 22. Next, the worker removes the packing 50 from the piston 38 and replaces the packing 50 with a new one. The worker removes the inner seal member 30 from the cover member 18 and replaces the inner seal member 30 with a new one. Thereafter, the cylinder unit 12 is assembled in a procedure reverse to the above.

When it comes time to perform the maintenance work on the spare cylinder unit, the worker replaces the spare cylinder unit with the cylinder unit 12 on which the maintenance has been completed, in the same manner as described above. Thus, by using the spare cylinder unit, the operation down-time of a predetermined apparatus incorporating the air cylinder 10 can be shortened.

Further, according to the present embodiment, when a maintenance work is performed on the cylinder unit 12, it is not necessary to remove the first tube fitting 128*a*, the first supply/discharge tube 140*a*, the second tube fitting 128*b*, the second supply/discharge tube 140*b*, the first position sensor 148*a*, the second position sensor 148*b*, and the like from the base member 82. That is, it is not necessary to disassemble the adapter unit 14. Therefore, the number of maintenance work processes is reduced. In addition, the maintenance work is simplified.

Since the cover member 18 is removed from the cylinder tube 16, the outer seal member 34 can be replaced.

When the first seal member 80*a* and the second seal member 80*b* are replaced with new ones, the worker separates the adapter unit 14 from the cylinder unit 12 to expose the first seal accommodation hole 74*a* and the second seal accommodation hole 74*b*, in the same manner as described above. Thereafter, the worker takes out the first seal member 80*a* and the second seal member 80*b* from the first seal accommodation hole 74*a* and the second seal accommodation hole 74*b*, respectively, and replaces them with new ones.

When the first fitting seal member 136*a* and the second fitting seal member 136*b* are replaced with new ones, the worker slides the first slide pin 112*a* and the second slide pin 112*b* in the Y2 direction. Accordingly, the first slide pin 112*a* and the second slide pin 112*b* are separated from the base member 82. As a result, the first tube fitting 128*a* and the second tube fitting 128*b* are released from the constraint by the first slide pin 112*a* and the second slide pin 112*b*, respectively. Next, the worker pulls the first tube fitting 128*a* and the second tube fitting 128*b* in the Z2 direction. As a result, the first fitting seal member 136*a* mounted on the first tube fitting 128*a* and the second fitting seal member 136*b* mounted on the second tube fitting 128*b* are exposed. Thereafter, the worker removes the first fitting seal member 136*a* and the second fitting seal member 136*b* from the first tube fitting 128*a* and the second tube fitting 128*b*, respectively, and replaces them with new ones.

As described above, according to the present embodiment, all the seal members such as the inner seal member 30 and the second fitting seal member 136*b* can be replaced by a simple operation. That is, maintenance works can be easily performed on the air cylinder 10.

As described above, the present embodiment discloses the fluid pressure cylinder including: the cylinder unit (12) including the cylinder tube (16) in which the piston chamber (22) is formed, and the piston (38) accommodated in the piston chamber and configured to be slidable in the axial direction of the cylinder tube; the adapter unit (14) configured to be attachably and detachably mounted on the cylinder tube; and the positioning member (86) configured to position the adapter unit with respect to the cylinder unit, wherein the cylinder tube includes the first input/output port (84*a*) and the second input/output port (84*b*) configured to communicate with the piston chamber to supply and discharge the pressure fluid to and from the piston chamber, wherein the adapter unit includes: the first attachment hole (116*a*) to which the first supply/discharge tube (140*a*) is attached to be connected to the first input/output port; the second attachment hole (116*b*) to which the second supply/discharge tube (140*b*) is attached to be connected to the second input/output port; and the position sensor (148*a*, 148*b*) configured to detect the position of the piston, and wherein the adapter unit is attachable to and detachable from the cylinder unit in a state of holding the position sensor, and the adapter unit is positioned and fixed to the cylinder tube via the positioning member.

With this configuration, the adapter unit can be removed from the cylinder tube in a state that the first supply/discharge tube, the second supply/discharge tube, and the like are connected to the adapter unit and the adapter unit holds the position sensor. Therefore, for example, in a case that the seal member in the cylinder tube is replaced with a new one, the adapter unit is first separated from the cylinder tube, and then the cylinder unit is disassembled.

In this way, according to the above configuration, when maintenance is performed on the cylinder unit, it is not necessary to remove the first supply/discharge tube, the second supply/discharge tube, the position sensor, and the like from the adapter unit. Therefore, the number of maintenance work processes is reduced. Further, the maintenance work is simplified. That is, the maintenance work can be performed on the fluid pressure cylinder easily.

Moreover, the mounting position of the position sensor with respect to the adapter unit remains unchanged before and after the adapter unit is removed from the cylinder tube. Therefore, after the adapter unit is attached to the cylinder tube, the piston is positioned at a predetermined position, whereby the position sensor and the piston can be aligned with each other. Thus, the piston and the position sensor can be easily aligned with each other even under a situation where the worker cannot visually recognize the piston.

In addition, the cylinder tube and the adapter unit are connected by the positioning member, whereby the adapter unit can be easily positioned and fixed to the cylinder tube.

The present embodiment discloses the fluid pressure cylinder wherein the adapter unit includes the insertion hole (144), the cylinder tube includes the engagement recess (76), and one end portion of the positioning member is inserted into the insertion hole and engaged.

The adapter unit is positioned and fixed to the cylinder tube by passing one end portion of the positioning member through the insertion hole and then engaging the one end portion with the engaging recess. As a result, the adapter unit is prevented from falling off from the cylinder tube during use of the fluid pressure cylinder. Therefore, it is also possible to avoid the occurrence of positional deviation between the first input/output port and the second input/output port formed in the cylinder tube and the first supply/discharge tube and the second supply/discharge tube provided in the adapter unit.

The present embodiment discloses the fluid pressure cylinder wherein the engagement recess is located between the first input/output port and the second input/output port, and the insertion hole is located between the first attachment hole and the second attachment hole.

In this case, it is possible to avoid a situation where a space between the first input/output port and the second input/output port becomes a so-called dead space. That is, the space between the first input/output port and the second input/output port can be effectively used. The same applies to the space between the first attachment hole and the second attachment hole.

The present embodiment discloses the fluid pressure cylinder wherein the cylinder tube includes the adapter supporting surface (90, 92) configured to support the adapter unit, and the adapter unit is configured to be attached to and detached from the cylinder unit by being slid along the adapter supporting surface.

In this configuration, the adapter unit can be mounted on the cylinder tube by sliding the adapter unit along the adapter supporting surface. Similarly, when the adapter unit is detached from the cylinder tube, the adapter unit is slid along the adapter supporting surface. As described above, according to the present embodiment, the adapter unit can be easily attached to and detached from the cylinder tube.

The present embodiment discloses the fluid pressure cylinder wherein the adapter supporting surface has a flat surface extending along the axial direction.

In a case of being a flat surface, it is easy for the adapter unit to slide along the adapter supporting surface. That is, in this case, the adapter unit can be smoothly slid along the adapter supporting surface. Therefore, the adapter unit can be more easily attached to and detached from the cylinder tube.

The present embodiment discloses the fluid pressure cylinder wherein the cylinder tube includes the cylinder-side engagement portion (68), and the adapter unit includes the adapter-side engagement portion (96) configured to be engaged with the cylinder-side engagement portion, and the cylinder-side engagement portion and the adapter-side engagement portion are engaged with each other to thereby prevent the cylinder tube and the adapter unit from moving relative to each other in a direction (Z) perpendicular to the adapter supporting surface.

The adapter unit is prevented from falling off from the cylinder tube by the cylinder-side engagement portion and the adapter-side engagement portion engaging with each other.

The present embodiment discloses the fluid pressure cylinder wherein the cylinder tube includes the plurality of cylinder-side engagement portions (73) including the cylinder-side engagement portion, and the adapter unit includes the plurality of adapter-side engagement portions (97) including the adapter-side engagement portion.

This makes it more difficult for the adapter unit to fall off from the cylinder tube.

The present embodiment discloses the fluid pressure cylinder wherein the adapter unit includes: the base member (82) provided with the first attachment hole and the second attachment hole; the first slide pin (112*a*) and the second slide pin (112*b*) configured to be attachably and detachably attached to the base member, the first tube fitting (128*a*) configured to be attached to the distal end of the first supply/discharge tube, and the second tube fitting (128*b*) configured to be attached to the distal end of the second supply/discharge tube, and wherein the first slide pin is attached to the base member and engaged with the first tube fitting to thereby position and fix the first tube fitting to the first attachment hole, and the second slide pin is attached to the base member and engaged with the second tube fitting to thereby position and fix the second tube fitting to the second attachment hole.

According to this configuration, the first tube fitting and the second tube fitting can be positioned and fixed to the base member by attaching the first slide pin and the second slide pin to the base member. Therefore, it is not necessary to screw-engage the first slide pin and the second slide pin with the base member. Thus, according to the present embodiment, the first tube fitting and the second tube fitting can be easily positioned and fixed to the base member. Further, the first tube fitting and the second tube fitting can be easily attached to and detached from the base member by attaching and detaching the first slide pin and the second slide pin to and from the base member.

The present embodiment discloses the fluid pressure cylinder wherein the adapter unit includes the sensor mounting groove (146*a*, 146*b*) in which the position sensor is mounted.

In this case, the position sensor is received in the sensor mounting groove. Therefore, for example, when the maintenance is performed on the fluid pressure cylinder, the position sensor is prevented from interfering with any objects. In other words, the position sensor is protected.

Moreover, it should be noted that the present invention is not limited to the disclosure described above, and various alternative or additional configurations can be adopted therein without departing from the essence and gist of the present invention.

REFERENCE SIGNS LIST

10: air cylinder
12: cylinder unit
14: adapter unit
16: cylinder tube
22: piston chamber
26: piston rod
30: inner seal member
34: outer seal member
38: piston
50: packing
52: magnet
60: first flat portion
62: second flat portion
64: third flat portion
68: first recessed groove
72: first protruding end
73: cylinder-side engagement portion
76: engagement recess
80*a*: first seal member
80*b*: second seal member
82: base member
84*a*: first input/output port
84*b*: second input/output port
86: positioning pin
90: first bottom portion
92: second bottom portion
96: second protruding end
97: adapter-side engagement portion
100: third protruding end
102: second recessed groove
112*a*: first slide pin
112*b*: second slide pin
116*a*: first attachment hole
116*b*: second attachment hole
122*a*: first communication hole
122*b*: second communication hole
128*a*: first tube fitting
128*b*: second tube fitting
136*a*: first fitting seal member
136*b*: second fitting seal member
138*a*: first engagement groove
138*b*: second engagement groove
140*a*: first supply/discharge tube
140*b*: second supply/discharge tube
144: insertion hole

146*a*: first sensor mounting groove
146*b*: second sensor mounting groove
148*a*: first position sensor
148*b*: second position sensor

The invention claimed is:

1. A fluid pressure cylinder comprising:

a cylinder unit including a cylinder tube in which a piston chamber is formed, and a piston accommodated in the piston chamber and configured to be slidable in an axial direction of the cylinder tube;

an adapter unit configured to be attachably and detachably mounted on the cylinder tube; and a positioning member configured to position the adapter unit with respect to the cylinder unit, wherein the cylinder tube includes a first input/output port and a second input/output port configured to communicate with the piston chamber to supply and discharge a pressure fluid to and from the piston chamber, wherein the adapter unit includes:

a first attachment hole to which a first supply/discharge tube is attached to be connected to the first input/output port;

a second attachment hole to which a second supply/discharge tube is attached to be connected to the second input/output port; and a position sensor configured to detect a position of the piston, and wherein the adapter unit is attachable to and detachable from the cylinder unit in a state of holding the position sensor, and the adapter unit is positioned and fixed to the cylinder tube via the positioning member.

2. The fluid pressure cylinder according to claim 1, wherein the adapter unit includes an insertion hole, and the cylinder tube includes an engagement recess, and one end portion of the positioning member is inserted into the insertion hole and engaged.

3. The fluid pressure cylinder according to claim 2, wherein the engagement recess is located between the first input/output port and the second input/output port, and the insertion hole is located between the first attachment hole and the second attachment hole.

4. The fluid pressure cylinder according to claim 1, wherein the cylinder tube includes an adapter supporting surface configured to support the adapter unit, and the adapter unit is configured to be attached to and detached from the cylinder unit by being slid along the adapter supporting surface.

5. The fluid pressure cylinder according to claim 4, wherein the adapter supporting surface includes a flat surface extending along the axial direction.

6. The fluid pressure cylinder according to claim 5, wherein the cylinder tube includes a cylinder-side engagement portion, and the adapter unit includes an adapter-side engagement portion configured to be engaged with the cylinder-side engagement portion, and the cylinder-side engagement portion and the adapter-side engagement portion are engaged with each other to thereby prevent the cylinder tube and the adapter unit from moving relative to each other in a direction perpendicular to the adapter supporting surface.

7. The fluid pressure cylinder according to claim 6, wherein the cylinder tube includes a plurality of cylinder-side engagement portions including the cylinder-side engagement portion, and the adapter unit includes a plurality of adapter-side engagement portions including the adapter-side engagement portion.

8. The fluid pressure cylinder according to claim 1, wherein the adapter unit includes:

a base member provided with the first attachment hole and the second attachment hole;

a first slide pin and a second slide pin configured to be attachably and detachably attached to the base member;

a first tube fitting configured to be attached to a distal end of the first supply/discharge tube; and a second tube fitting configured to be attached to a distal end of the second supply/discharge tube, and wherein the first slide pin is attached to the base member and engaged with the first tube fitting to thereby position and fix the first tube fitting to the first attachment hole, and the second slide pin is attached to the base member and engaged with the second tube fitting to thereby position and fix the second tube fitting to the second attachment hole.

9. The fluid pressure cylinder according to claim 1, wherein the adapter unit includes a sensor mounting groove in which the position sensor is mounted.

* * * * *